United States Patent
Overby et al.

(10) Patent No.: US 12,406,298 B2
(45) Date of Patent: Sep. 2, 2025

(54) USER APPLICATION APPROVAL

(71) Applicant: MULTI SERVICE TECHNOLOGY SOLUTIONS, INC., Overland Park, KS (US)

(72) Inventors: Derek Overby, Overland Park, KS (US); Irfan Sayyad, Overland Park, KS (US)

(73) Assignee: Multi Service Technology Solutions, Inc., Overland Park, KS (US)

( * ) Notice: Subject to any disclaimer, the term of this patent is extended or adjusted under 35 U.S.C. 154(b) by 0 days.

(21) Appl. No.: 18/049,193

(22) Filed: Oct. 24, 2022

(65) Prior Publication Data

US 2024/0135443 A1    Apr. 25, 2024
US 2024/0233009 A9    Jul. 11, 2024

(51) Int. Cl.
*G06Q 40/00* (2023.01)
*G06Q 40/03* (2023.01)

(52) U.S. Cl.
CPC .................................. *G06Q 40/03* (2023.01)

(58) Field of Classification Search
CPC ...................................................... G06Q 40/03
See application file for complete search history.

(56) References Cited

U.S. PATENT DOCUMENTS

| | | | |
|---|---|---|---|
| 2012/0266227 A1* | 10/2012 | Colson | G06Q 30/06 726/7 |
| 2014/0075500 A1 | 3/2014 | B'Far et al. | |
| 2014/0173732 A1* | 6/2014 | Stibel | H04L 51/043 726/22 |
| 2016/0180456 A1 | 6/2016 | Hochstatter et al. | |
| 2018/0060954 A1* | 3/2018 | Yin | H04L 63/08 |
| 2019/0026827 A1* | 1/2019 | Rose | G06Q 20/108 |
| 2020/0402162 A1 | 12/2020 | Thomas et al. | |
| 2022/0067208 A1* | 3/2022 | Miller | G06Q 30/018 |
| 2022/0180429 A1* | 6/2022 | Tomich | G06Q 40/03 |

OTHER PUBLICATIONS

Lowry, Software System Decomposition, Dec. 17, 2019 (Year: 2019).*
Lowy, Juval (Software System Decomposition, Addison-Wesley Professional, Dec. 17, 2019) (Year: 2019).*
Non-Final Office Action received for U.S. Appl. No. 18/346,678, mailed on May 8, 2025, 23 pages.

* cited by examiner

*Primary Examiner* — Mark H Gaw
(74) *Attorney, Agent, or Firm* — Shook, Hardy & Bacon L.L.P.

(57) ABSTRACT

The present disclosure comprises systems, methods, and computer readable media that allows processing of merchant credit applications. An integration service is provided herein that retrieves external information regarding the merchant credit application. The integration service provides for normalizing an external information and mapping it to the businesses and entities within its own database. Additionally, the integration service is able to compile a dataset for a decision service to efficiently analyze the merchant credit application.

18 Claims, 10 Drawing Sheets

USER APPLICATION APPROVAL

BACKGROUND

Merchant credit applications are submitted by business entities to request trade credit for business to business transactions. Each merchant credit application requires a large amount of data retrieval from a variety of sources. Merchant credit applications may not be from existing or well-known business entities. Approval for credit is contingent on external sources of information related to a merchant applicant.

SUMMARY

At a high level, aspects described herein relate to systems and methods that process merchant credit applications. The present technological advance can absolve technological issues which the merchant credit applications present based on their need for many internal and external data.

In one aspect, one or more computer storage media storing computer-readable instructions is disclosed. The computer-readable instructions are executed by one or more processors to perform one or more computer operations that comprise receiving, by a centralized integration processor, a request to authorize a merchant for a merchant credit application. The computer operations further comprise querying a database, by the centralized integration processor, the database comprising a list of known business entities. Additionally, the computer operations may identify, by the centralized integration processor, a first business entity match within the list of known business entities. Further, a first confidence level is determined for the first business entity match. Subsequently, based on the first confidence level being above a pre-determined threshold, the computer operations comprise automatically requesting a user indication if the first business entity match is associated with the merchant.

Aspects herein provide a method for a merchant credit application. The method comprises receiving, by a processor, a request to authorize a merchant and querying a database based on the request. Additionally, the processor may identify a plurality of business entities that match the merchant within a database, wherein each business entity match is based at least, in part, on partial match with the merchant. Subsequently, the processor may determine a confidence level of each business entity match. Then the processor may receive a selection of a primary business entity from the merchant. Finally, based on the selection of the primary business entity, the processor automatically retrieves additional information related to the primary business entity.

Additional aspects considered hereof provide a system comprising a processor that may perform operations to receive, from a new merchant, a request to authorize the new merchant. Next, the processor may receive, from an external database, a list of similar business entities. Additionally, it is contemplated that the processor may receive, from the new merchant, a selection of a first business entity from the list of similar business entities. Subsequently the processor may receive, from a first external source, a commercial credit score for the new merchant. Finally, the processor may determine, based at least in part on a personal credit score and the commercial credit score, a decision for the request to authorize the new merchant.

This summary is intended to introduce a selection of concepts in a simplified form that is further described in the detailed description section of the present disclosure. It is neither intended to identify key or essential features of the claimed subject matter, nor is it intended to be an aid in determining the scope of the claimed subject matter. Additional objects, advantages, and novel features of the technology will be set forth in part in the detailed description that follows, and in part will become apparent to those skilled in the art upon examination of the present disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
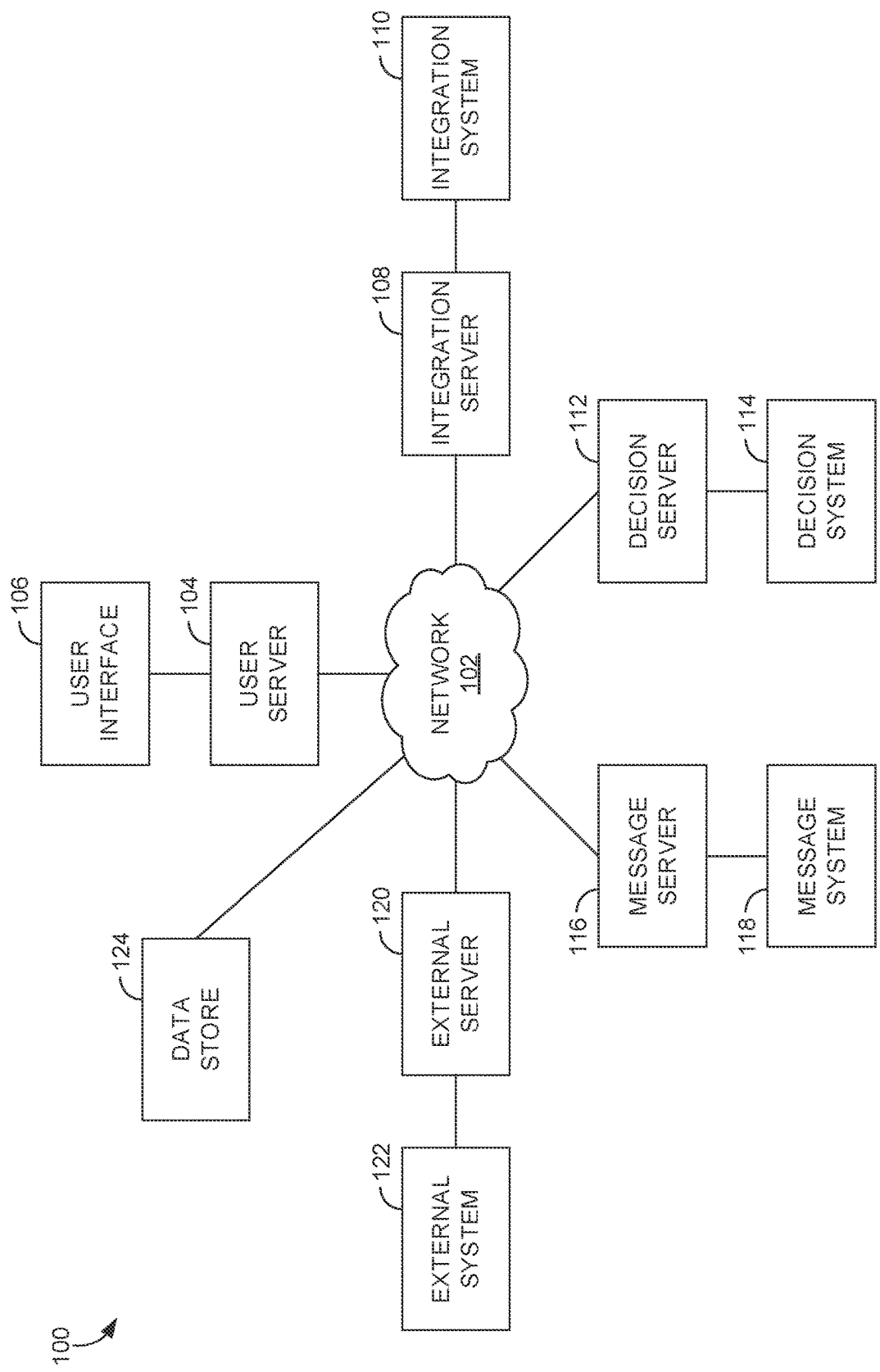
FIG. 1 is an example operating environment in which aspects of the present disclosure may be employed to process and authorize a merchant credit applicant.

Merchant credit applications are submitted with a desire from a merchant to obtain credit it can extend to a buyer. In most instances, the merchant credit applications require a trade credit issuer to retrieve additional information related to the merchant credit application. Such information may be commercial credit information, personal credit information, uniform commercial code data, and office of foreign assets and control data. Each piece of information likely comes from a distinct external source that requires coordination of many application program interfaces and retrieval of a variety of different formatting of data. Some sources of the information may differ in a format they provide that information and, as such, external data must also be converted into a usable, normalized data.

The sources of the information desired may also change at a rapid pace. For example, the commercial credit information may come from a credit monitoring service when the merchant credit applications are first being received. In the future, the commercial credit information may come from a different credit monitoring service. Additionally, the trade credit issuers may, in the future, require additional or different information than currently required for a trade credit to be issued to a merchant. As such, changes occurring to a merchant credit application processing software must be entirely re-written to accommodate the new service.

In some aspects, a merchant credit applicant relates to a merchant entity applying or requesting a trade credit with the trade credit issuer. The merchant entity may be a buyer, a seller, or any other business or personal entity. In one embodiment, the merchant entity may be a seller. The seller may be any corporate, commercial, charitable, religious, non-profit, and/or other entity (including commercial customer's employees, agents, or other authorized persons) that sells goods or services to a buyer/purchaser/customer. In an alternative embodiment, the merchant credit applicant may be a purchaser. The purchaser may be any corporate, commercial, charitable, religious, non-profit, and/or other entity (including commercial customer's employees, agents, or other authorized persons) that buys goods or services from the seller.

The present disclosure provides methods of using a series of services, including an integration service, for processing the merchant credit applications. The present disclosure also provides a centralized technology for managing external data sources. By using some of the processes described herein, the need for the technology to be entirely re-done is eliminated when changes to the application information needs adjustment. Instead, only a small portion of the application information may need to be modified to adjust to changing external systems. By performing merchant credit application processing procedure using a system that uses a volatility based decomposition architecture, the system can also change based on a change in the external systems and databases.

The present disclosure provides methods that can use centralized integration services that provide a modifiable service that is able to map and link internal and external data efficiently. Additionally, the centralized integration service is able to provide a uniform data set to a decision logic service so as to be able to decide whether or not to issue the trade credit to a merchant applicant. The systems and methods described herein provide advantages to the existing application processing technology.

For instance, a centralized integration system is able to receive any un-standardized data from an external source and convert it to normalized data to be used in credit decision logic. The centralized integration system retrieves external data from a wide array of sources that requires the centralized integration system to be capable of interacting with multiple interfaces and programs. As such, the current technology provides the centralized integration service that houses application program interfaces that directly communicate with each of the external sources. The centralized integration service is also able to retrieve and store data in normalized standards that may not come from the external sources. This is different from current systems that do not have the centralized integration system that communicates with the external sources and retrieves information from each of the many external sources and may potentially store dissimilar data structures in original non-unstandardized data structure(s).

Relative to existing technologies and computer functionality, the methods of the present disclosure reduce network latency, reduce packet generation costs, and reduce computer input/output (I/O), among other computer function benefits. This is because particular embodiments reduce the number of hardware components that need to be contacted, over a computer network, at a credit application processor, since the communication with the external sources occurs using a single service or a server rather than multiple services or servers at a time. What this means is that fewer (or no) packets have to be generated and sent over the computer network. Each time a service is contacted, for example, contents or payload of the request is typically supplemented with header information or other metadata within a packet in TCP/IP or other protocol networks. Accordingly, when this functionality is multiplied by all the services needed to obtain the desired data, there are network latency costs by repetitively generating the metadata and sending it over the computer network. However, as described above, communication with external sources occurs using only the single service or the server, which means there are fewer packets to generate and fewer messages to traverse the computer network, thereby reducing network latency. This has a further technical effect of decreasing the computer I/O. With respect to the existing technologies, continuous communication with multiple services increases storage device I/O (for example, excess physical read/write head movements on non-volatile disk) because, with each communication or data packet sent, a computing system has to reach out to the storage device I/O to perform a read or write operation, which is error prone, and eventually wears on components, such as a read/write head. When multiplied by all the multiple service communication requirements, this causes excessive wear on the read/write head and causes excessive energy consumption and heat, which leads to other computational issues, such as memory errors. However, as described above, there are fewer (or no) times that embodiments perform I/O. Consequently, there is not as much wear and tear on the read/write head, and there is not as much energy consumption and heat generation, and hence the likelihood of memory errors is reduced.

Additionally, in some embodiments, the methods of the present disclosure improve computer security relative to existing technologies because the external sources are contacted and accessed using the single service rather than multiple services. In other words, more the number of times a data packet has to traverse the computer network (which occurs with existing technologies), higher the likelihood that data will be sniffed or otherwise compromised. Sniffing is a process of monitoring and capturing all data packets passing through a given network. Attackers use sniffer code to capture data packets containing sensitive information, such as password, account information, and the like. However, as described above, some embodiments only use the single service rather than multiple services, which means there are less packets getting transmitted over the computer network, which consequently means that the data is less likely to be sniffed by attackers. The centralized integration service is also easily modifiable to adapt to changing external source code or systems since the centralized integration service is built based on the volatility based decomposition architecture that allows for only a portion of the architecture to be changed at a time.

It will be realized that the method previously described is only an example that can be practiced from the description that follows, and it is provided to understand the technology and recognize its benefits. Additional examples are now described with reference to the figures.

With reference now to FIG. 1, which is an example operating environment 100 in which aspects of the present disclosure can be employed to process and authorize a merchant credit applicant. As illustrated, the operating environment 100 comprises a network 102, a user server 104 associated with a user interface 106, an integration server 108 associated with an integration system 110, a decision server 112 associated with a decision system 114, a message server 116 associated with a message system 118, and an external server 120 associated with an external system 122, that can communicate with other components of FIG. 1 through the network 102.

The network 102 may include one or more networks (for example, public network or virtual private network "VPN"). In a non-limiting example, the network 102 may include one or more local area networks (LANs), wide area networks (WANs), or any other communication network or method. Each of the components in FIG. 1 may communicate directly or indirectly with other components through the network 102.

The operating environment 100 further comprises a data store 124. The data store 124 generally stores information including data, computer instructions (for example software program instructions, routines, or services), or models used in the embodiments of the present disclosure. Although depicted as a single data store component, the data store 124 is embodied as one or more data stores or is in the cloud or other distributed architectures. One example suitable for use as the data store 124 is memory 212 discussed with reference to FIG. 2.

The data store 124 may include one or more storage devices configured to collect, store, delete, update, and/or modify data in accordance with one or more instructions received from one or more other components, the user server 104, the integration server 108, the decision server 112, the message server 116, and the external server 120. For example, the data store 124 may include any suitable combination of one or more storage mediums, such as hard disk drives, solid state memory, cloud-based storage devices, etc. In various aspects, the data store 124 may store data in addition to or instead of data stored locally by the user server 104, the integration server 108, the decision server 112, the message server 116, and the external server 120. In doing so, the user server 104, the integration server 108, the decision server 112, the message server 116, the external server 120, the data store 124, and/or other back-end components may store any suitable type of data used to facilitate various functionalities of certain aspects as described herein.

Having identified various components of the operating environment 100, it is emphasized that any additional or fewer components, in any arrangement, may be employed to achieve the desired functionality and are within the scope of the present disclosure. Although, the various components of FIG. 1 are shown with lines for the sake of clarity, the lines can illustrate a direct path of communication from one component to another or may represent a path where other intermediary components are present.

While the components of FIG. 1 are depicted as single components, the depictions are intended as examples in nature and in number and are not to be construed as limiting for all implementations of the present disclosure. Other arrangements and elements (for example machines, interfaces, functions, orders, and groupings of functions, etc.) can be used in addition to or instead of those shown, and some elements may be omitted altogether. As non-limiting examples, while the user server 104, the integration server 108, the decision server 112, the message server 116, and the external server 120 are each illustrated as a single server, it will be understood that each illustrates one or more servers working with one another in any arrangement. As another example, the data store 124 may illustrate one or more data stores provided in any arrangement throughout the operating environment 100. This may include one or more data stores 124 specifically associated with, and in communication with, each of the user server 104, the integration server 108, the decision server 112, the message server 116, and the external server 120 to provide data and computer-usable instructions to each of their respective components. Therefore, for the sake of brevity and clarity, when the components of FIG. 1, or any other figure, are referred to in singular, it is intended to include functions performed by one or more components working together.

The functionality of the operating environment 100 can be further described based on the functionality of the described components. That is, many of the components described in relation to FIG. 1 are entities that perform functions. Various functions described herein are being performed by one or more components and may be carried out by a hardware, a firmware, and/or a software. That is, functions performed by the components of FIG. 1 can be performed by executing computer-executable instructions stored in memory, such as the data store 124.

In general, a server, such as the user server 104, the integration server 108, the decision server 112, the message server 116, and the external server 120, comprises a processor in communication with computer-readable media. The processor executes instructions on the computer-readable media. As previously discussed, the servers illustrated as single servers can be one or more servers working to execute a particular described function.

In one aspect, the user server 104, the integration server 108, the decision server 112, the message server 116, and the external server 120 may be implemented as any suitable number and/or type of a computing device (for example one or more computer servers) configured to communicate with other components, or one or more client interface, such as the user interface 106 (or suitable data stores and/or storage devices associated therewith), etc. In various aspects, the servers described above may be configured to process application programming interface (API) service calls, to support one or more applications installed on one or more devices associated with the user server 104, the integration server 108, the decision server 112, the message server 116, and the external server 120, etc.

As illustrated, the operating environment 100 comprises the user server 104 that is associated with the user interface 106 that can be any such user interface that allows the user or merchant to access accounts and pages associated with a merchant credit authorization. The user interface 106 can receive communications via the network 102 and the user server 104 and maintain accounts within the user server 104 in accordance with instructions received within the communications. For instance, the user interface 106 can identify a user's selection and input. The user interface 106 can cause to be displayed messages provided by the message system 118 and any other system that may communicate with the user interface 106 by way of the network 102. The user server 104 may also communicate instructions received from the user interface 106 by way of the network 102 to other servers, such as the integration server 108. The user interface 106 and the user server 104 are associated with the merchant applicant, an external bank, an external data store system, or any other user that may input or provide information to the network 102.

It will be understood that the integration server 108 may perform actions similar to the user server 104 on behalf of the integration system 110. Throughout the present disclosure, the integration server 108, the integration system 110 or integration service, the decision server 112, the decision system 114, the message server 116, the message system 118, the external server 120, and the external system 122 are referred to in terms of particular roles performed within the described example. However, it will also be understood that such servers and systems may perform other roles for different interactions.

It will be understood that the integration server 108 is associated with the integration system 110. The integration system 110 operates in part as a logic system that processes application data from the merchant applicant by way of the user interface 106. The integration server 108 and the integration system 110 may operate in connection with the external system 122, the data store 124 and other systems to query various data stores, request information, or provide information to other systems and servers.

The decision server 112 on behalf of the decision system 114 may perform various activities. For instance, the decision server 112 can receive various datasets from one or more servers by way of the network 102. The decision server 112 operates using a variety of data logic systems including, but not limited to, simple rules based logic, machine learning algorithms applied to a neural network, decision logic trees, or any other algorithm build and/or trained to make a variety of decisions based on the data provided.

In the present aspects, the decision server 112 is configured to access data from and/or store data to one or more additional data sources stored in the data store 124 that is included as one or more of back-end computing devices. Additionally, or alternatively, the decision server 112 may access data from one or more servers, such as the user server 104, the integration server 108, the message server 116, and the external server 120 and/or data provided by one or more users associated with one or more user interfaces 106. In various aspects, any combination and/or subset of the aforementioned data may form a dynamic data set that changes over time as additional data is collected, and that is stored and/or updated in one or more components, such as the user server 104, the integration server 108, the decision server 112, the message server 116, and the external server 120, and transmitted by way of the network 102 and/or accessed by the decision server 112. For example, the decision server 112 may use any suitable portion of the dynamic data set as training data to train a machine-learning model.

Once the machine-learning model is trained in this way, the machine-learning model is applied to data received to identify, predict, or decide various portions related to the process of approving or denying merchant credit application. Moreover, once such decisions, predictions, or identifications are made, aspects include the decision server 112 to receive results from a prior merchant credit application so as to re-train or add additional training data to improve the machine-learning model. The machine-learning model is described here with respect to the decision server 112 and the decision system 114 but may be used with respect to any server and system described herein. For example, the integration server 108 may implement the machine-learning model with respect to data retrieved by the server.

As illustrated, the operating environment 100 comprises the integration server 108 that is associated with the integration system 110. The integration server 108 can receive communications via the network 102 and maintain accounts within the integration server 108 in accordance with instructions received within the communications. For instance, the integration system 110 or the integration service may receive various portions of a merchant credit application and combine the portions into one application to be sent to the decision server 112 and the decision system 114 by way of the network 102. Additionally, the operating environment 100 comprises the message server 116, the message system 118, the external server 120, and the external system 122. Each of these systems and servers may operate in accordance with instructions received and may communicate with other servers and systems by way of the network 102. Each of the servers and systems may also retrieve information from the data store 124.

Figure 2:
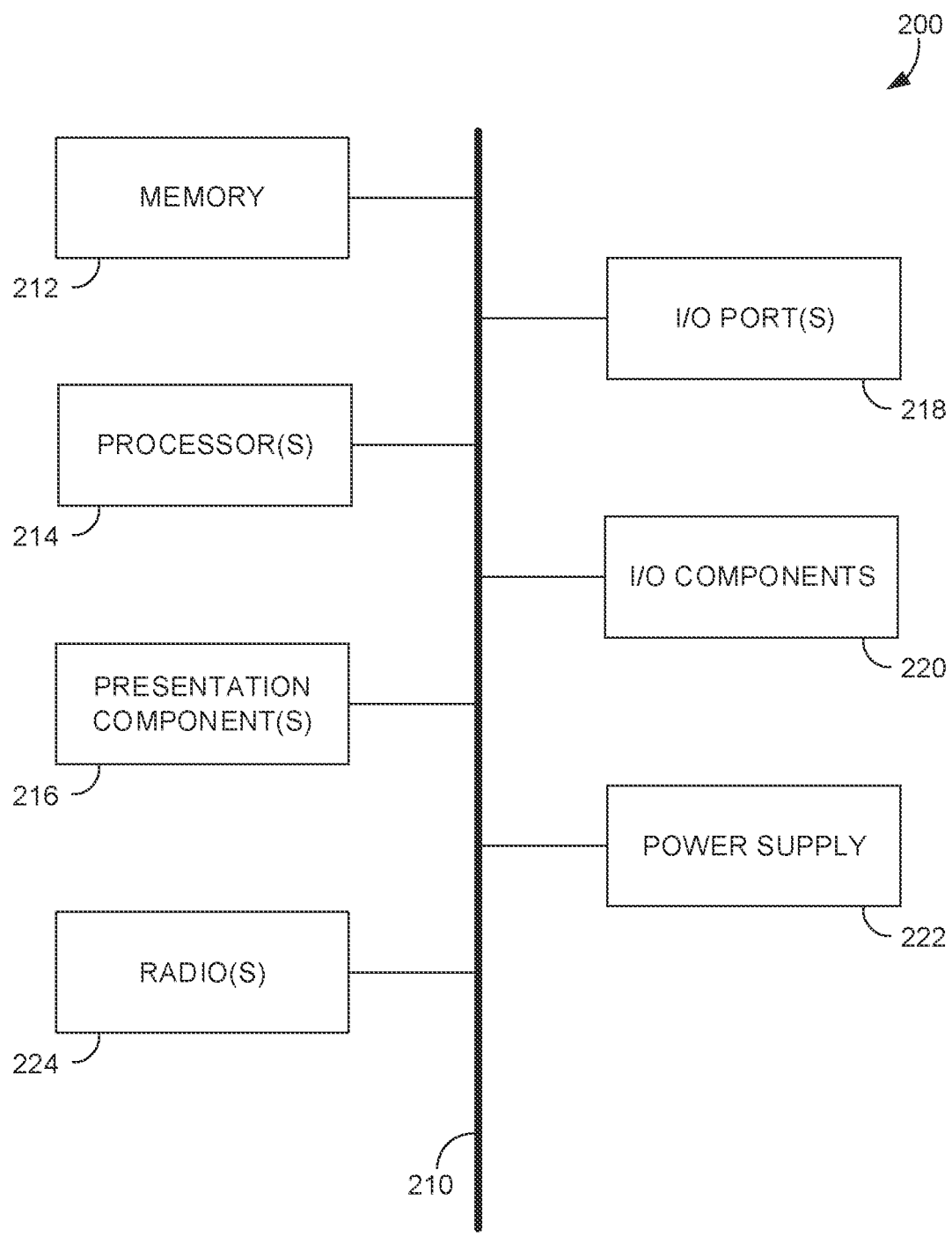
FIG. 2 is an example computing device suitable for implementing aspects of the present disclosure, in accordance with an embodiment described herein.

An example operating environment in which some of the present disclosure is implemented is described below in order to provide a general context for various aspects. Referring to FIG. 2, in particular, an example operating environment for implementing embodiments of the present disclosure is shown and designated generally as a computing device 200. The computing device 200 is an example of a suitable computing environment and is not intended to suggest any limitation as to the scope of use or functionality of the technology. Neither should the computing device 200 be interpreted as having any dependency or requirement relating to any one or combination of components illustrated.

The technology of the present disclosure is described in the general context of computer code or machine-useable instructions, including computer-executable instructions, such as program modules, being executed by a computer or other machine, such as a personal data assistant or other handheld device. Generally, the program modules including routines, programs, objects, components, data structures, etc., refer to a code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 2, the computing device 200 includes a bus 210 that directly or indirectly couples the following devices: the memory 212, one or more processor(s) 214, one or more presentation component(s) 216, input/output port(s) 218, input/output components 220, and illustrative power supply 222. The bus 210 represents what may be one or more busses (such as an address bus, data bus, or a combination thereof).

Although the various blocks of FIG. 2 are shown with lines for the sake of clarity, in reality, delineating various components is not so clear, and metaphorically, the lines would more accurately be grey and fuzzy. For example, one may consider a presentation component, such as a display device, to be an I/O component 220. As another example, processor(s) 214 may also have memory. Such is the nature of the art, and it is again reiterated that the diagram of FIG. 2 merely illustrates an example computing device that can be used in connection with one or more embodiments of the present disclosure. Distinction is not made between such categories as "workstation," "server," "laptop," "hand-held device," etc., as all are contemplated within the scope of FIG. 2 and reference to the "computing device."

The computing device 200 typically includes a variety of computer-readable media. The computer-readable media can be any available media that can be accessed by the computing device 200 and includes both volatile and non-volatile media, and removable and non-removable media. By way of non-limiting example, the computer-readable media may comprise computer storage media and communication media.

The computer storage media includes volatile and non-volatile media, removable and non-removable media implemented in any method or technology for storage of information, such as computer-readable instructions, data structures, program modules or other data. The computer storage media includes, but is not limited to, random-access memory (RAM), read-only memory (ROM), electronically erasable programmable read-only memory (EEPROM), flash memory or other memory technology, compact disc read-only memory (CD-ROM), digital versatile disks (DVDs) or other optical disk storage, magnetic cassettes, magnetic tape, magnetic disk storage or other magnetic storage devices, or any other medium that can be used to store the desired information that can be accessed by the computing device 200. The computer storage media excludes signals per se.

The communication media typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information associated therewith. By way of non-limiting example, the communication media includes wired media, such as a wired network or direct-wired connection; and wireless media, such as acoustic, RF, infrared, and other wireless media. Combinations of any of the above should also be included within the scope of computer-readable media.

The memory 212 includes computer storage media in the form of volatile or nonvolatile memory. The memory 212 may be removable, non-removable, or a combination thereof. Example hardware devices include solid-state memory, hard drives, optical-disc drives, etc. The computing device 200 includes one or more processor(s) 214 that read data from various entities, such as the memory 212 or the I/O components 220. The presentation component(s) 216 present data indications to a user or other device. Examples of the presentation component(s) 216 include a display device, speaker, printing component, vibrating component, etc.

The I/O port(s) 218 allow the computing device 200 to be logically coupled to other devices including the I/O components 220, some of which may be built in. Illustrative components include a microphone, joystick, game pad, satellite dish, scanner, printer, wireless device, and the like.

Figure 3:
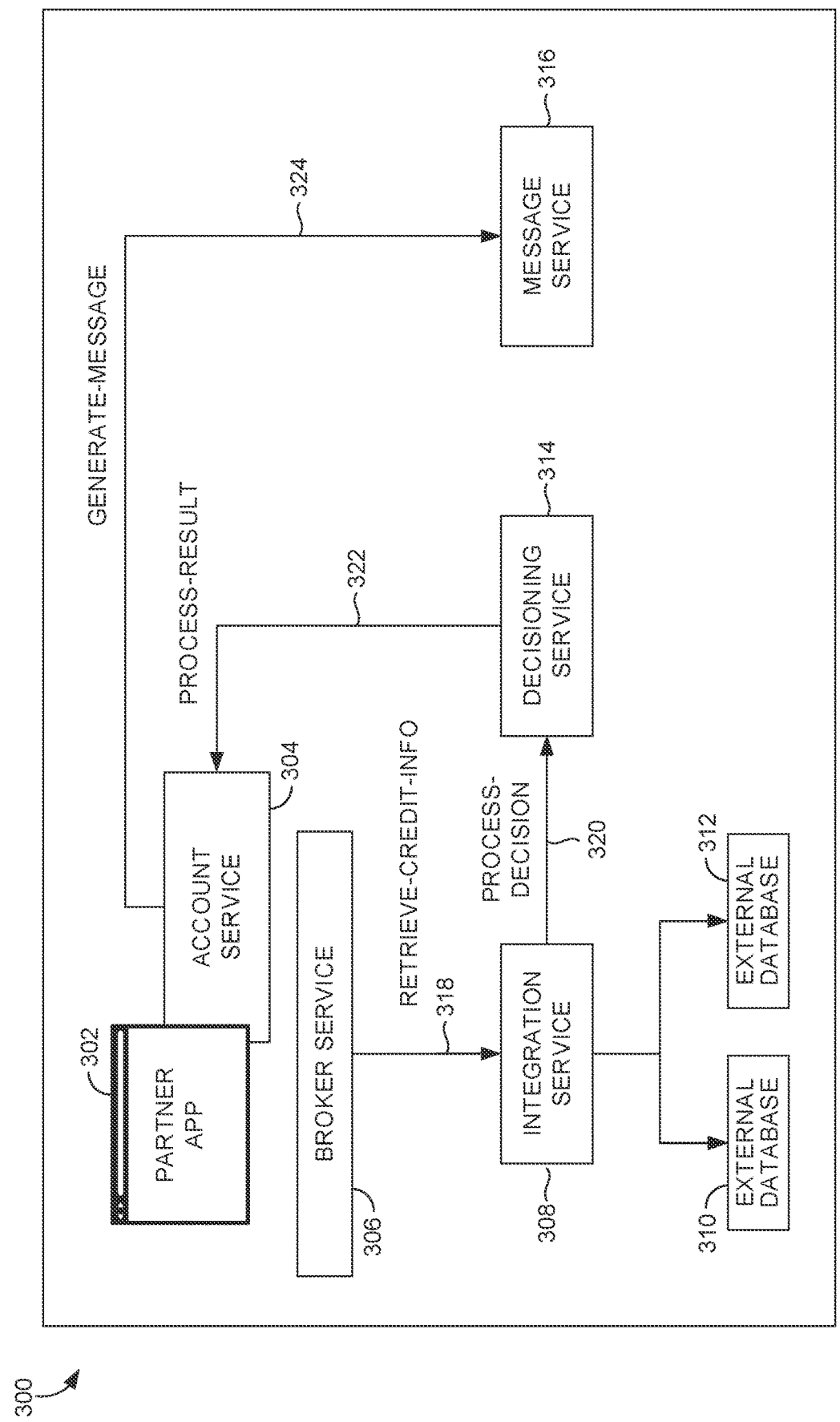
FIG. 3 is an example operating environment, in accordance with an aspect described herein.

Referring now to FIG. 3, which is an example operating environment 300 that can be utilized for processing and approving a merchant credit application process, in accordance with aspects provided herein. It should be understood that the operating environment 300 is an example that can be performed using the current technology, and that other processes for processing and approving the merchant credit application and variations of the operating environment 300 are contemplated but are not discussed in detail for brevity. Th operating environment 300 is one process flow that can be performed by the components of FIG. 1 and provides many of the benefits and advantages previously discussed. As illustrated, the operating environment 300 comprises a partner application 302 (referred to as "partner app" in FIG. 3), an account service 304, a broker service 306, an integration service 308, an external data stores 310 and 312, a decisioning service 314, and a message service 316.

Having identified the various components of the operating environment 300, it is emphasized that any additional or fewer components, in any arrangement, may be employed to achieve the desired functionality and are within the scope of the present disclosure. Although, the various components of FIG. 3 are shown with lines for the sake of clarity, the lines can illustrate a direct path of communication from one component to another or may represent a path having other intermediary components.

While the components of FIG. 3 are depicted as single components, the depictions are intended as exemplary in nature and in number and are not to be construed as limiting for all implementations of the present disclosure. Other arrangements and elements (for example machines, interfaces, functions, orders, and groupings of functions, etc.) can be used in addition to or instead of those shown, and some elements may be omitted altogether.

The partner application 302 may be used in connection with the user interface 106 and the user server 104. The partner application 302 may be designed as a user interface that allows a user to input information related to the merchant credit application. Additionally, the partner application 302 may be designed as a user interface that may display results of the decision of the merchant credit application. The partner application 302 may also be used as an interface that allows other services, applications, servers, or systems to request information from the user or the merchant applicant. For example, the integration service 308 may request additional information from the merchant applicant, such as additional business owner information. The merchant applicant may then input additional information into the partner application 302 in response to the request. Additionally, the partner application 302 may provide user authentication so as to provide that the merchant credit application is securely stored. The partner application 302 may require the user to input identification credentials to access the partner application 302. In other aspects, the partner application 302 may use additional user identification methods, such as facial recognition, fingerprint recognition, 2-step authorization, or other methods.

Currently, application approval services retrieve information from external databases in various formats using a non-centralized system which deals with the information individually, which in often-times must be obtained from multiple sources since each source is often-times incomplete since records in separate locations are not timely or readily shared or cannot be consolidated due to format inconsistencies. To solve this problem, the integration service 308 provides a network-based method that collects, converts, consolidates merchant information from various data bases into a standardized format, and stores it in network-based storage devices or data stores.

As such, in one embodiment, the integration service 308 operates using a volatility based decomposition architecture. In some instances, the integration service 308 may operate to integrate one or more operations built into an original integration service 308 scheme. As database changes or requirements on the integration service 308 changes, changes are needed to be made within the integration service 308. As such, software and processes need to be altered which may require additional components or processes to be added. The volatility based decomposition architecture allows for the insertion or modification of portions of the integration service 308 to accommodate changes within the databases, methods, or processes. Such standardization generates a reduction in the number of database reads required to process and analyze the retrieved information. Additionally, the integration service 308 is able to consolidate all information from multiple sources into one location for easy processing. Consolidating the information into one location reduces the number of database reads as well and reduces the number of I/O functions in order to process the application data. By consolidating and converting the information into a standardized format, the system is improving the function of the computer.

The account service 304 may operate in conjunction with the partner application 302. The account service 304 may operate to house or store merchant application information in a secure manner. The account service 304 may provide the partner application 302 access to the integration service 308 by way of an API, such as the APIs described in relation to FIG. 1.

The broker service 306 is a service that may implement an Advanced Message Queuing Protocol (AMQP). The broker service 306 is mostly used in a distributed platform architecture, and provides message queue services through clustering, but the broker service 306 may also be in a single cluster form. The broker service 306 may be used to send and receive messages to and from the partner application 302, the account service 304, the integration service 308, the external data store 310 or 312, the decisioning service 314, the message service 316, and/or any other portion of the operating environment 300 described herein or not described herein. The broker service 306 may provide a queuing that allows for the operating environment 300 to manage multiple requests and the merchant credit applications at a time. The broker service 306 may implement computer implemented code that houses a method for managing one or more merchant credit applications and steps required to complete them. At step 318, the broker service 306 may retrieve from a data store, credit information related to the merchant credit application. As will be described herein, the credit information retrieved may be from an external source, an internal source, and may also be related to one or more owners associated with the buyer in the merchant credit application. The credit information may also be related to the merchant applicant.

The integration service 308 provides a technological improvement to current technological problems created by current merchant credit applications. The integration service 308 provides for a method of collecting and managing large amounts of data required for the merchant credit application. The integration service 308 may also process incoming data and determine if there is additional data needed. For instance, the integration service 308 may receive from the broker service 306, a merchant credit application that originated from the partner application 302. The integration service 308 may then identify, from the merchant credit application, merchant information, such as business identity, ownership identity, ownership information, business location, and any other information required to complete the merchant credit application. Using at least a portion of this information and using one or more APIs, the integration service 308 may query external data stores, such as the external data store 310 and 312. These queries may be used to identify a known business entity within that data store and identify credit and other business information. In one example, the external data stores 310 and 312 may be a trade credit insurance bureau and a credit monitoring bureau.

The external data store 310 may be operated as a trade credit insurer. This trade credit insurer may provide trade credit insurance that provides an insurance policy and a risk management product offered by private insurance companies and governmental export credit agencies to business entities wishing to protect their accounts receivable from loss due to credit risks, such as protracted default, insolvency, or bankruptcy. The external data store 310 or the trade credit insurer may comprise a data store of existing merchants who have received trade credit or other actions that may cause the trade credit insurer to input the merchant applicant into the data store. The integration service 308 may query the external data store 310. Such a query may be for a known business entity within the external data store 310. The external data store 310 returns matches and partial matches to the integration service 308.

The external data store 312 may be operated as the credit monitoring bureau. This credit monitoring bureau may provide credit scores for the merchant applicant, the business owners, and the business itself. The external data store 312 or the credit monitoring bureau may comprise a data store of existing merchants who have a known business and other actions that may cause the credit monitoring bureau to input the merchant applicant into the data store. The external data store 312 may also comprise a data store of known individuals who have received personal or commercial credit and have a known credit score. The integration service 308 may query the external data store 312. Such a query may be for a known business entity within the external data store 312. The query may also be for any individual listed within the merchant credit application, such as an owner or a part-owner of the buyer. The external data store 312 may return matches and partial matches to the integration service 308.

The integration service 308 may, identify from the returned matches, a known business entity within the external data store 310 and 312. Further, the integration service 308, at step 318, retrieves credit information from the external data store 312 and trade credit insurance information related to the merchant applicant and any other subsidiary, business owner, or individual related to the merchant credit application.

At step 320, the integration service 308 may determine that the merchant credit application contains sufficient information for determining if a decision may be made regarding the merchant credit application. As used herein, the term "sufficient information" may include, but is not limited to, merchant business information, such as a business identifier, a data universal numbering system (DUNS) number, or other data and information related to the business, business owner information, credit score information for any entity or individual listed or related to the merchant credit application, and any other data that may be pertinent to making a trade credit decision. The decisioning service 314 may receive a completed merchant credit application from the integration service 308 and may make a decision whether the system will provide trade credit to the merchant applicant. Additionally, the decisioning service 314 may decide regarding trade credit limits for the merchant applicant.

Once a decision has been made, at step 322, the results may be processed as an input into the account service 304 related to the merchant applicant. Additionally, the message service 316 may generate one or more messages 324 related to the decision. The message may contain the result from the decisioning service 314, the credit limit if approved, the rejection message, and any other message related to the decisioning service 314. Additionally, the message service 316 may create messages from the integration service 308 to the partner application 302 requesting additional information.

Figure 4:
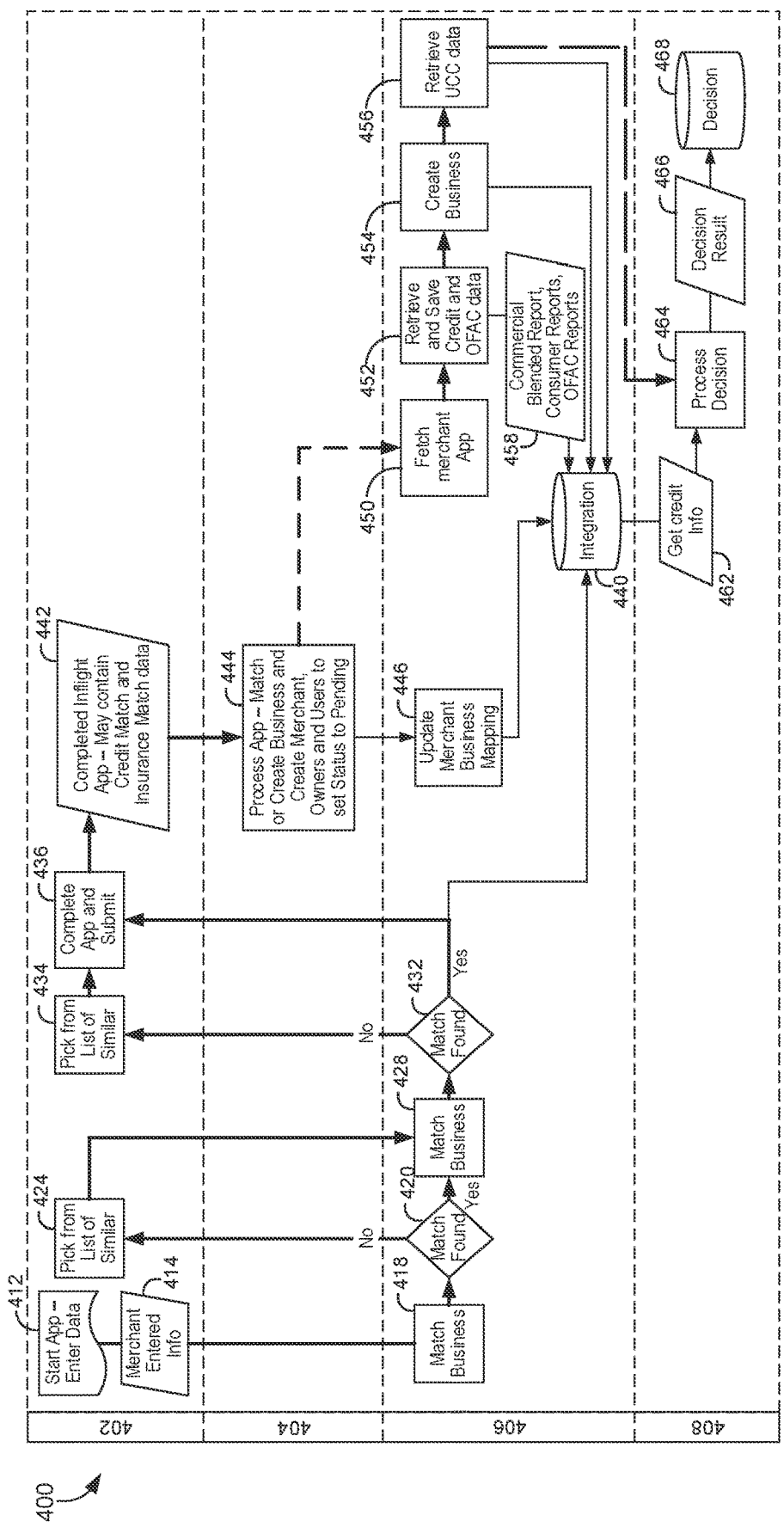
FIG. 4 is an example process flow that can be performed by components of the operating environment of FIG. 1 and FIG. 3 and the computing device of FIG. 2, in accordance with an aspect described herein.

Turning now to FIG. 4 that represents an example process flow 400 that can be performed by components of the operating environment of FIG. 1 and FIG. 3 and the computing device 200 of FIG. 2, in accordance with an aspect described herein. The process flow 400 comprises four general services. The process flow 400 comprises a user interface service, such as a user interface 402, an application service 404, an integration service 406, and a decision service 408. Each of the services correspond to one or more servers and systems previously described herein. It is noted that the procedures are examples, and that other arrangements may be possible. All of these aspects, including various other arrangements will be apparent to those of ordinary skill in the art in view of the present disclosure, and such aspects are contemplated within the scope of the present disclosure. While the process flow 400 is described as a series of steps, it should be recognized that these steps are illustrative and not intended to limit the present disclosure to the specific aspect illustrated in FIG. 4.

The user interface 402 may provide an exemplary interface that allows the user or the merchant applicant to start the merchant credit application by entering data 412 into the user interface 402. In one example, the user interface 402 may be a web-based application that requires the user to provide user authentication or identification to access the merchant credit application. The user interface 402 may also provide selectable and fillable form fields, such as that required by the integration service 406, that may detail what is required by the user or the merchant applicant for a complete merchant credit application. A merchant entered info 414 is input by the user into the user interface 402. In one aspect, the merchant entered info 414 is saved or input into the application service 404 that may be associated with a database or data store, such as the data store 124 in FIG. 1.

The integration service 406 may then query an external database, such as the external data store 310, related to credit insurers, such as Euler Hermes. The query by the integration service 406 to the credit insurer is based at least in part on the merchant entered info 414. The integration service 406 may directly communicate with the credit insurer by way of an API. The query may be executed to search a credit insurer data store for business entities within its data store that match in step 420 or partially match the merchant entered info 414. In some instances, the query will return a complete match with full confidence that an identical business returned is the same as the business included in the merchant applicant. In other instances, the query will return a partial match. That partial match may be analyzed by the integration service 406 and a confidence level may be determined based on the matching of the merchant entered info 414 and information related to the partial match. For example, a query by the integration service 406 for the credit insurer may return a partial match and the integration service 406 may determine that the partial match has a 60% confidence level that it is associated with the merchant applicant. In other instances, the query may return a plurality of matched business entities, each match having its own confidence level assigned by the integration service 406.

In some instances, the business entities within the external data store 310 is stored in a non-standardized form. For example, the external database, such as the external data store 310, can store business information in an array, linked list, stack, queue, hash table, tree, heap, graph, or any other data form. The integration service 406, may retrieve business information from multiple database sources, each having a different non-standardized form. Additionally, the external databases accessed can also change a form of storage of the data. By using the volatility based decomposition architecture, the integration service 406 may be modified so as to be able to convert new types or forms data structure to a data form used by the integration service 406.

Once the non-standardized data is retrieved from the external database, the integration service 406 coverts the non-standardized data into a standardized form to be analyzed. For example, if a set of data is retrieved from the external database as a hash data form, the integration service 406 may convert it to an array. In this example, the hash data is unusable by the integration service 406 as it does not have a capacity to search or query such hash data. As such, the integration service 406 is able to convert the data from the external database from a first form to a second usable form.

When the query of the credit insurer returned one or more partial matches, the integration service 406 identifies at least a top partial match or a list of partial matches based on confidence levels. This top partial match may then be sent by the integration service 406 by way of a messaging service, such as the message service 316 or the message system 118, and by way of the network 102 to the user interface 402. In one example, a single partial match is the top match. In another example, at least two partial matches may be returned having the same confidence level assigned to them. Upon being sent to the user interface 402, the user interface 402 may present the partial match or partial matches as a list of similar matches in step 424. The user or merchant applicant may then log on using the credentials to access the user interface 402 and select from the list of similar business entities found within the credit insurer data store. That selection is then sent to the integration service 406 that proceeds to amend the merchant credit application to include the information related to the partial match found and selected by the merchant applicant.

The integration service 406 may proceed to submit a query to a second external data store related to a credit score monitoring service if the match from a first query is above a threshold, or the merchant applicant selects one of the partial matches. As such, the integration service 406 may then query the external database, such as the external data store 312, related to the credit score monitoring service, such as Equifax. The query by the integration service 406 to the credit score monitoring service is based at least in part on the merchant entered info 414. The integration service 406 may directly communicate with the credit score monitoring service by way of an API. The query may be executed to search the credit score monitoring service for business entities within its data store that match in step 432 or partially match the merchant entered info 414. In some instances, the query will return a complete match with full confidence that it is an identical business as contained in the merchant applicant. In other instances, the query will return a partial match. That partial match may be analyzed by the integration service 406 and a confidence level may be determined based on the matching of the merchant entered info 414 and the information related to the partial match. For example, the integration service 406 query of the credit score monitoring service may return a partial match and the integration service 406 may determine that the partial match has a 60% confidence level that it is associated with the merchant applicant. In other instances, the query may return a plurality of matched business entities, where each match has its own confidence level assigned by the integration service 406.

The integration service 406 may, following a determination that the query of the credit score monitoring service returned one or more partial matches, identify at least a top partial match or a list of partial matches based on confidence levels. This top partial match may then be sent by the integration service 406 by way of a messaging service, such as the message service 316 of FIG. 3, and by way of a network, such as the network 102 of FIG. 1, to the user interface 402. In one example, a single partial match is the top match. In another example, at least two partial matches may be returned having the same, or similar to, within a predefined threshold, confidence level assigned to them. Upon being sent to the user interface 402, the user interface 402 may present the partial match or partial matches as a list of similar matches in step 434. The user or merchant applicant may then log on using the credentials to access the user interface 402 and select from the list of similar business entities found within the credit score monitoring service. That selection is then sent to the integration service 406 that proceeds to amend the merchant credit application to include the information related to the partial match found and selected by the merchant applicant.

The integration service 406 may, in some embodiments, determine that the confidence level for a returned match for either query described above exceeds a pre-determined threshold. If the confidence level exceeds such a threshold, the integration service 406 determines that the match with the confidence level is associated with the merchant applicant and the business entity is associated with the merchant credit application. The integration service 406 may then send the information to the user interface 402 and the merchant applicant may proceed to step 436 and complete the merchant credit application and submit it for final analysis, processing, and review. In some instances, the user interface 402 automatically completes step 436 and automatically completes the merchant credit application (referred to as "completed inflight app" in step 442) and submits it. The completed merchant credit application 442 may contain information related to the matches found for the credit insurer (such as credit match and insurance match data) and the credit score monitoring service.

The application service 404 may then process the merchant credit application at step 444. The application service 404 may query a data store associated with the application service 404 to determine if there is a match or a partial match found within the data store. The query by the application service 404 to the data store associated with the application service 404 is based, at least in part, on the submitted merchant credit application found in the completed application 442. The application service 404 may directly communicate with the data store by way of an API. The query may be executed to search the data store for business entities within the data store that match or partially match the merchant applicant info in the completed merchant credit application 442. In some instances, the query will return a complete match with full confidence that it is the identical business as the merchant applicant. In other instances, the query will return a partial match. That partial match may be analyzed by the application service 404 and a confidence level may be determined based on the matching of the merchant info and the information related to the partial match. For example, a query by the application service 404 regarding the credit insurer may return a partial match and the application service 404 may determine that the partial match has a 60% confidence level that it is associated with the merchant applicant. In other instances, the query may return a plurality of matched business entities, where each match has its own confidence level assigned by the application service 404.

The application service 404 may, following a determination that the query of the credit score monitoring service returned one or more partial matches, identify at least a top partial match based on confidence levels. This top partial match may then be determined to be above a pre-determined threshold confidence level. As such, the application service 404 may then create, within the data store, an entry related to the merchant applicant. Such entry may contain information related to the business, merchant owners, credit information, credit insurer information, and other related information that may be contemplated by a person skilled in the art. Once an entry in the data store is identified or created for the merchant credit application, a status for the merchant credit application is changed or modified to be pending within the application service 404. The application service 404 may then send a message to the user interface 402 and the integration service 406 that the status has been updated to pending.

The merchant credit application is then sent to the integration service 406 for final processing and collection of data. At step 446, the integration service 406 updates the merchant business mapping within the integration service 406. As a part of the improvement to prior technology, the integration service 406 maps and links various data related to businesses. As such, the businesses may be linked and/or mapped together within the integration service 406 to provide for a more accurate and efficient merchant credit decision. This is done using the integration service 406 that may operate on an integration sever, such as the integration sever 108 of FIG. 1. This linking or mapping may be accomplished using the machine-learning model that allows the integration service 406 to actively learn how best to link and map the businesses within the data stores of the integration service 406.

In another embodiment, the integration service 406 further processes the merchant credit application in step 450 by retrieving merchant credit application from the application service 404. At step 452, the integration service 406 may, by use of an API, retrieve from external data store, such as the external data store 310, credit information for the merchant applicant, the primary business owner, and/or the business owners required. Such credit information may be retrieved, at step 458, as a commercial blended report, a consumer report, personal credit report, or any other credit reports. The integration service 406 may, at step 452, retrieve, from an external data store, Office of Foreign Assets Control (OFAC) data for the merchant applicant and/or any one or more business owners listed in the merchant credit application. Additionally, at step 458, an OFAC report may be retrieved related to the merchant credit application.

In some instances, at step 454, the integration service 406 may create a business entry within the data store of the integration service 406. For example, in order to map the business with other past and future merchant credit applications, the business must be created within its data store. Additionally, the integration service 406 may, at step 456, retrieve, from an external data store, uniform commercial code (UCC) filings related to the merchant credit application. The OFAC data and the UCC filings are retrieved in a similar fashion to the date associated with the credit insurer and the credit score information, as described previously. For example, the integration service 406 may query an external data store, by way of an API, using information associated with the merchant credit application, and retrieve matching information.

The integration service 406 may, at step 440, integrate all information and data received in relation to the merchant credit application. Such information is retrieved from a variety of external and internal sources, as provided herein. Additionally, the information retrieved may be automatically retrieved and mapped together using a machine-learning model that identifies patterns and similarities between applicants and applications information received. As such, the integration service 406 improves the technological problem caused by importing large amounts of applicant data into a single location from a variety of locations for a decision to be made. The integration service 406 maps the merchant credit application from start to finish and provides continuity as an efficient solution that reduces errors by ensuring accurate data for the decision service 408. At step 462, the decision service 408 receives or obtains credit information and information related to the merchant credit application.

At step 464, the decision service 408 retrieves a report or data set related to the merchant credit application. As the integration service 406 has mapped and accumulated all information in a standardized structure associated with the merchant credit application, the decision service 408 may decide on the merchant credit application. The decision may be made based on the data set related to the merchant credit application provide by the integration service 406. Since the integration service 406 gathers and provides a total data set of all available data, the decision service 408, at step 464, is allowed to make an accurate decision. Additionally, the decision service 408 may use a machine-learning model to make the final decision. Such a machine-learning model may be trained using data related to prior decisions made and outcomes based on delinquencies, current payments, payoff amounts, or other information related to prior credit approvals. In some instances, a merchant credit application may not be able to have a decision made by the decision service 408. For instance, there may arise an occasion where the merchant credit application may have an error or an anomaly that may require a human to review and correct the error or anomaly. The decision result 466 may be sent as a decision message 468 to the user interface 402. Such communications are further described in relation to FIG. 5.

Figure 5:
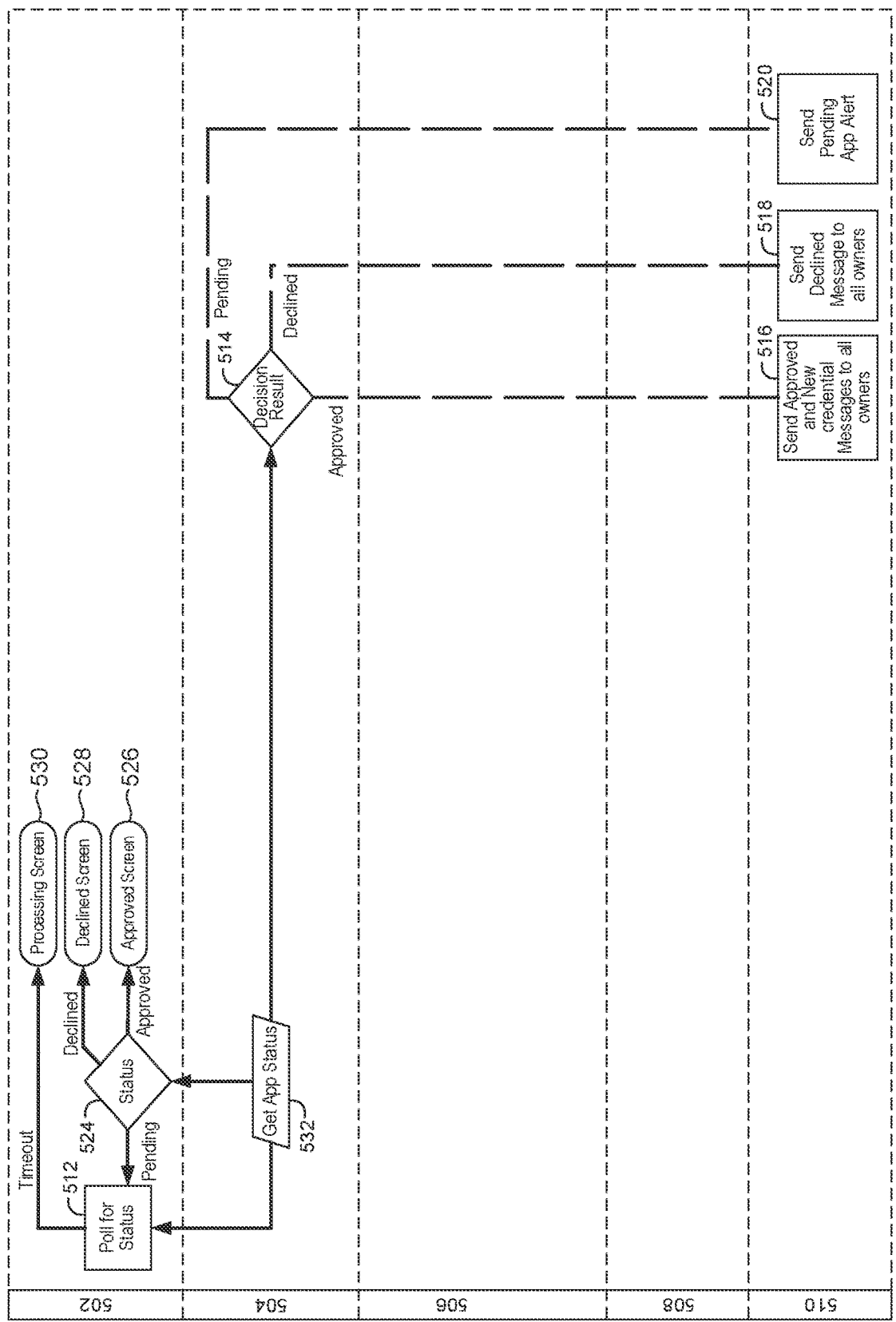
FIG. 5 is an example process flow that can be performed by components of the operating environment of FIG. 1 and FIG. 3 and the computing device of FIG. 2, in accordance with an aspect described herein.

Turning now to FIG. 5 that represents an example process flow 500 that can be performed by components of the operating environment of FIG. 1 and FIG. 3 and the computing device 200 of FIG. 2, in accordance with an aspect described herein. The process flow 500 comprises four general services. The process flow 500 comprises a user interface service, such as a user interface 502, an application service 504, an integration service 506, a decision service 508, and a message service 510. Each of the services correspond to one or more servers and systems previously described herein in connection with FIG. 4, for example. It is noted that the procedures are examples, and that other arrangements are possible. All of these aspects, including various other arrangements will be apparent to those of ordinary skill in the art in view of the present disclosure, and such aspects are contemplated within the scope of the present disclosure. While the process flow 500 is described as a series of steps, it should be recognized that these steps are illustrative and not intended to limit the present disclosure to a specific aspect illustrated in FIG. 5.

The user interface 502 may provide a user interface that corresponds to user interface 402 of FIG. 4 and allows the user or the merchant applicant or other users to access the merchant credit application. In one example, the user interface 502 may, at step 512, poll for the status of a submitted merchant credit application. The user interface 502 may provide a status of the merchant credit application at step 524. The status may be obtained from the application service 504 that may provide the status at step 524 as an update of pending as described previously with respect to FIG. 4. In an additional aspect, the application service 504, at step 532, may get the application status. The application status is updated within the application service 504 following a message being sent from the decision service 508. The decision result 514 is saved within the application service 504 in the data store associated with the application service 504. As such, the step 532, the application service 504 may obtain the status of the merchant credit application following the decision. In some instances, the decision result 514 is approved, declined, or pending. The status of the merchant credit application may then be updated in the application service 504 and then in the user interface 502 following the step 528 obtaining the status.

Once updated, the user interface 502 may display an approved screen at a step 526 or a declined screen at a step 528. In some instances, the merchant credit application is submitted and may require further review by an analyst of the application service 504 prior to submission. As the pending status of the application service 504 would not be indicated since the merchant credit application is not submitted, the status at the step 524 would timeout and the user interface 502 may display a processing screen at the step 530. Each of the approved screen at step 526, the declined screen at the step 528 and the processing screen at step 530 may show the decision or status and instructions for the merchant credit application of how to proceed following the status update.

In another aspect, the decision service 508 may send the decision result 514 to the application service 504. Following the application service 504 updating the merchant credit application within the application service 504, the application service 504 sends the decision result 514 to the message service 510. The message service 510 may then send a message to the user interface 502, to the merchant applicant, or to all or a partial list of owners of the merchant applicant. For example, an approved merchant credit application triggers the message service 510 to send an approval message 516 to all owners. A declined merchant credit application triggers the message service 510 to send a declined message 518 to all owners or a partial list of owners of the merchant applicant. Additionally, if the merchant credit application is pending, the message service 510 may send a pending application alert 520 to a risk management team within an internal system. A pending status message, such as the pending application alert 520, may trigger a review of the decision and the merchant credit application by the analyst. A pending status is due to an incomplete merchant credit application or an error that may require the analyst to review.

Figure 6:
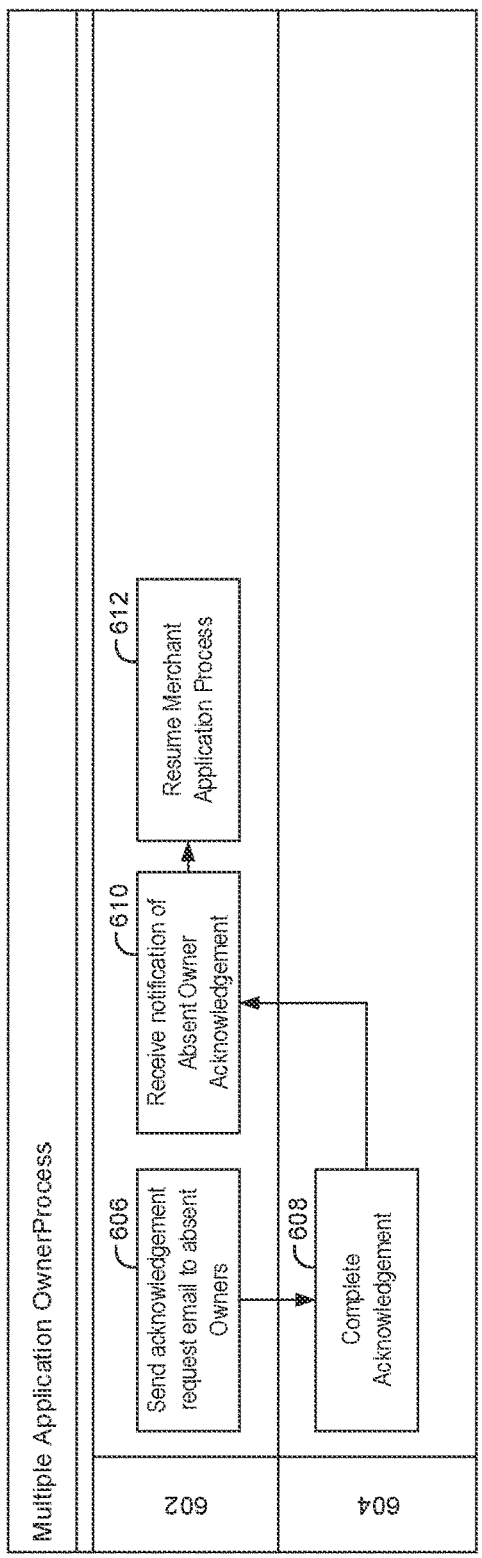
FIG. 6 is an example process flow that can be performed by components of the operating environment of FIG. 1 and FIG. 3 and the computing device of FIG. 2, in accordance with an aspect described herein.

Turning now to FIG. 6 that represents an example process flow 600 that can be performed by components of the operating environment of FIG. 1 and FIG. 3 and the computing device 200 of FIG. 2, in accordance with an aspect described herein. The process flow 600 comprises two general services. The process flow 600 comprises an integration service 602 and a user interface service 604. Each of the services correspond to one or more servers and systems previously described herein. It is noted that the procedures are examples, and that other arrangements are possible. All of these aspects, including various other arrangements will be apparent to those of ordinary skill in the art in view of this disclosure, and such aspects are contemplated within the scope of this disclosure. While the process flow 600 is described as a series of steps, it should be recognized that these steps are illustrative and not intended to limit the technology to the specific aspect illustrated in FIG. 6.

The integration service 602, as described previously in connection with FIG. 4 and FIG. 5 for example, processes merchant credit applications including reviewing the included information of the merchant applicant. Such information may include, but is not limited to, ownership information. Many businesses are owned by multiple owners and the merchant applicant may be one of many owners of the business. A completed merchant credit application requires information and acknowledgement for each owner and as such, the integration service 602 may send an acknowledgement request message 606 to all owners who have not completed a portion of the merchant credit application related to their personal information. In some instances, not all of the owners' information and acknowledgement need to be obtained. In some instances, only 50% of the owners of the business need have their personal information listed for data retrieval.

Once each owner receives the message 606, each may obtain login access and proceed to complete acknowledgment 608. By completing the acknowledgement, each owner may input personal information that may be used in the decision making process. For instance, the owners may input name, date of birth, social security number, address, and other personal information. In some instances, only a primary applicant or the merchant applicant who started the merchant credit application needs to add a social security number that is used for credit number retrieval. In some aspects, remaining non-primary or secondary owners who own at least 25% of the business are only used for OFAC data retrieval. In other aspects, all owners may have their personal credit retrieved for use in the decision process. Additionally, the merchant credit application may have a time limit and may close if all required owners do not complete their individual portion within a set time limit.

The integration service 602 may receive a notification 610 that each owner has acknowledged and completed their part of the merchant credit application. Prior to the notification 610, the merchant credit application remains incomplete and may not proceed. As such, the user interface (such as the user interface 502) described previously may have a pending status until all owners complete their portions. Once the notification 610 is received that all owners have completed their portions, the application process may resume at step 612.

With reference to FIG. 7 to FIG. 10, block diagrams are provided to illustrate methods for funds disbursement using a credit push. The methods are performed using components described herein, such as those described with reference to FIG. 1 through FIG. 6. In some embodiments, one or more computer storage media having computer-executable instructions embodied thereon that, when executed, by at least one processor, cause the at least one processor to perform the operations of the methods.

Figure 7:
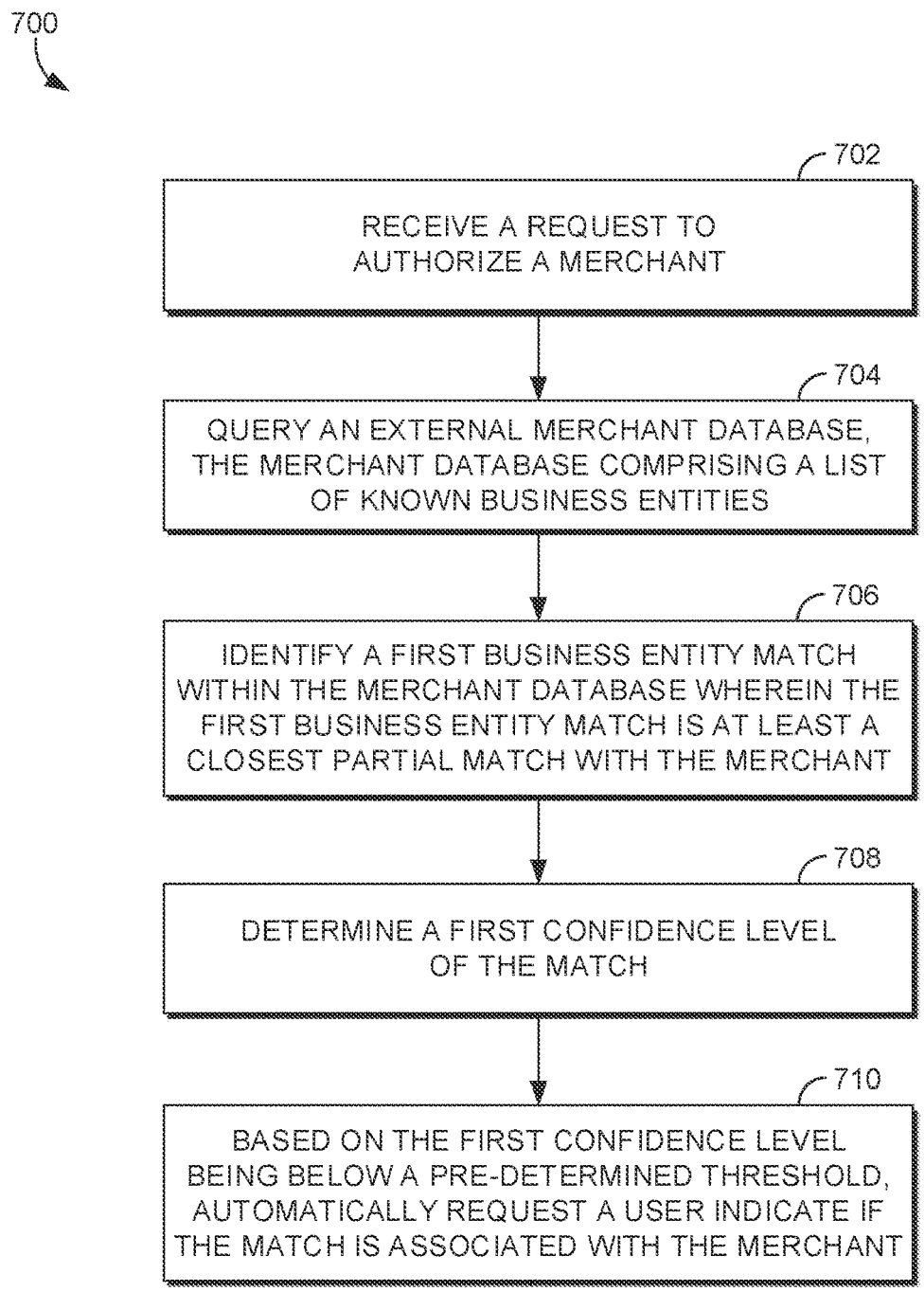
FIG. 7 is a block diagram illustrating example operations that can be performed by the components of the operating environment of FIG. 1 and FIG. 3, in accordance with aspects described herein.

FIG. 7 illustrates an example method 700 for processing a merchant credit application, in accordance with an aspect described herein. At block 702, an integration service may receive a request to authorize a merchant (or, merchant applicant). Such a request is associated with a merchant credit application with one or more owners associated with the business. The merchant credit application may require that the owner or owners input information related to the business, such as name, address, DUNS number, date of incorporation, subsidiaries, other names, or affiliates related to the business, or any other information related to the business. Additionally, the merchant credit application may require that each owner input personal information as described above.

In aspects of the present disclosure, the request to authorize the merchant applicant may come from a user interface. The user interface may include portions wherein the merchant applicant is required to input authentication information. The user interface may authenticate a user prior to allowing input of information related to the merchant credit application.

At block 704, the integration service may query an external merchant database, the external merchant database comprising a list of known business entities. The external merchant database is related to a credit insurer or a credit score monitoring service. The credit insurer may be an institution, such as Euler Hermes. The credit score monitoring service may be an institution, such as Equifax. The integration service may interface directly with the external merchant database by way of an API that permits direct access to data in the external merchant database.

At block 706, the integration service may identify a first business entity match within the external merchant database, wherein the first business entity match is at least a closest partial match with the merchant applicant. At block 708, the integration service may determine a first confidence level of the first business entity match. In some instances, the confidence level is less than 100%. In other aspects, multiple matches are received and none of them have a confidence level of 100%. As such, multiple partial matches are received, each having a confidence level.

At block 710, the integration service, based on the first confidence level being below a pre-determined threshold, may automatically request a user to indicate if the first business entity match is associated with the merchant applicant. In one aspect, the automatic request may present a plurality of matches that are below the pre-determined threshold. In another aspect, if the first confidence level is found to be above the pre-determined threshold, processing of the merchant credit application may proceed. Additionally, if the merchant credit application proceeds with the first business entity match, the merchant credit application is amended with additional information from the first business entity match received from the external merchant database.

Figure 8:
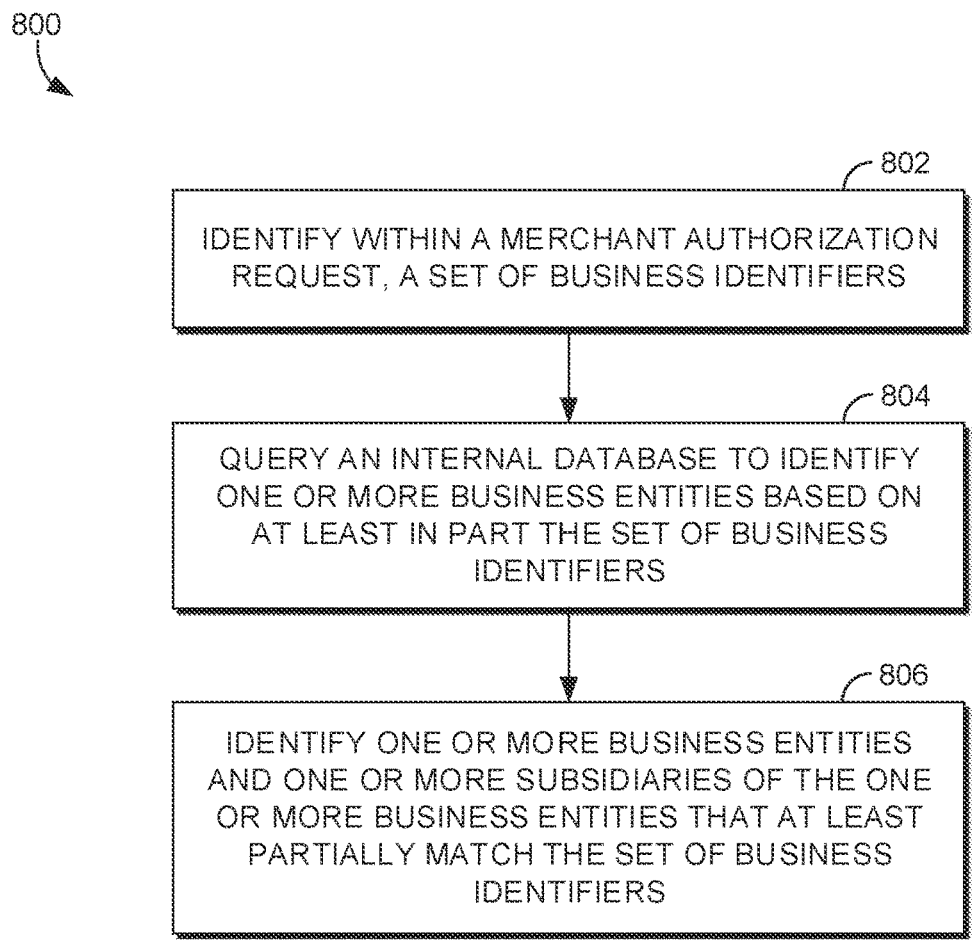
FIG. 8 is a block diagram illustrating example operations that can be performed by the components of the operating environment of FIG. 1 and FIG. 3, in accordance with aspects described herein.

FIG. 8 is an example method 800 for distributing processing the merchant credit application in accordance with an aspect described herein. At block 802, the integration service may identify within a merchant authorization request, a set of business identifiers. The business identifiers are a DUNS number, an EID number, or other business identifier. At block 804, the integration service may query an internal database to identify one or more business entities based on, at least in part, the set of business identifiers. The query may also include additional business information, such as business name and address. At block 806, the integration service may identify one or more business entities and one or more subsidiaries of the one or more business entities that at least partially match the set of business identifiers. In one aspect, the integration service may not identify a business entity within the internal database. In such aspect, the integration service may create a business entity within the internal database.

Figure 9:
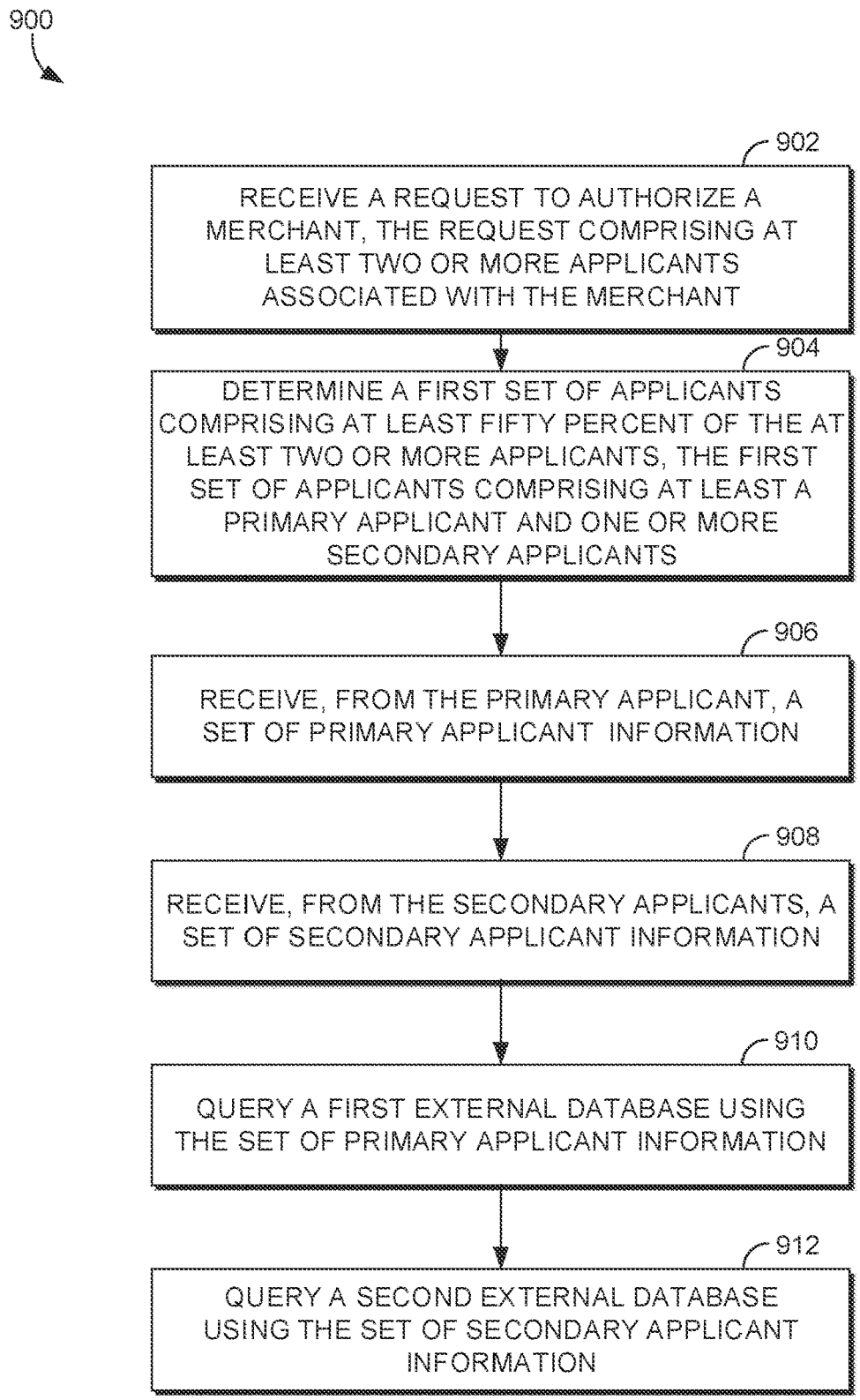
FIG. 9 is a block diagram illustrating example operations that can be performed by the components of the operating environment of FIG. 1 and FIG. 3, in accordance with aspects described herein.

FIG. 9 is another example method 900 for authorizing merchant credit applications. At block 902, the integration service may receive a request to authorize a merchant, the request comprising at least two or more applicants associated with the merchant. In an aspect, each applicant is an owner of the merchant. In another aspect, each owner owns at least 25% of the merchant. At block 904, the integration service may determine a first set of applicants comprising at least fifty percent of the at least two or more applicants, the first set of applicants comprising at least a primary applicant and one or more secondary applicants.

At block 906, the integration system may receive, from the primary applicant, a set of primary applicant information. The primary applicant information may include but is not limited to name, date of birth, email address, physical address, social security number, and any other personal information requested. At block 908, the integration system may receive, from the secondary applicants, a set of secondary applicant information. The secondary applicant information comprises name, date of birth, and email address. At block 910, the integration service may query a first external database using the set of primary applicant information. In one aspect, the first external database is a credit score monitoring service. At block 912, the integration service may query a second external database using the set of secondary applicant information. In one aspect, the second external database is the same as the first database. In another aspect, the second database is related to OFAC data.

Figure 10:
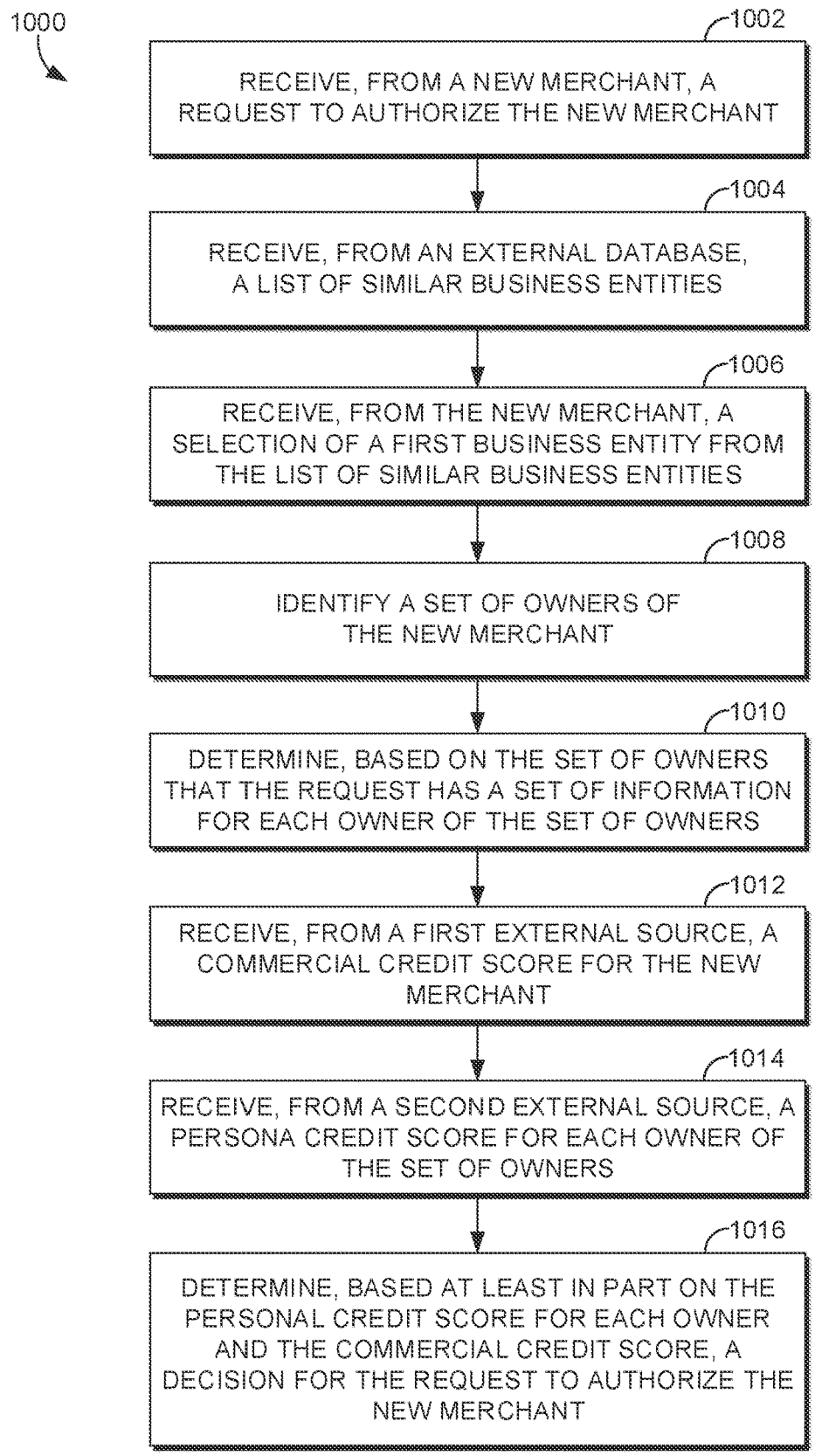
FIG. 10 is a block diagram illustrating example operations that can be performed by the components of the operating environment of FIG. 1 and FIG. 3, in accordance with aspects described herein.

FIG. 10 is another example method 1000 for authorizing merchant credit applications in accordance with an aspect described herein. At block 1002, the integration service may receive, from a new merchant, a request to authorize the new merchant. Such a request may comprise a merchant credit application submitted by a primary applicant owner. The new merchant may comprise one or more owners, each of them owning a percentage of the new merchant. At block 1004, the integration service may receive, from an external database, a list of similar business entities. These similar business entities are based on the information provided within the merchant credit application.

At block 1006, the integration service may receive, from the new merchant, a selection of a first business entity from the list of similar business entities. The new merchant may comprise a primary applicant from a list of a plurality of applicants. In some embodiments, each applicant are an owner of the new merchant. At block 1008, the integration service may identify a set of owners of the new merchant. At block 1010, the integration service may determine, based on the set of owners, that the request has a set of information for each owner of the set of owners.

At block 1012, the integration service may receive, from a first external source, a commercial credit score for the new merchant. The first external source may comprise the credit score monitoring service. The credit score monitoring service may use the input of the merchant credit application and the business entity identified to receive the commercial credit score. At block 1014, the integration service may receive, from a second external source, a personal credit score for each owner of the set of owners. The second external source may comprise a second credit score monitoring service. The second external source may also comprise the same credit monitoring service as the first external source. At block 1016, the integration service may determine, based at least in part on the personal credit score for each owner and the commercial credit score, a decision for the request to authorize the new merchant.

Embodiments described above are combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present disclosure is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" or "having," or variations thereof, has the same broad meaning as the word "comprising," and the word "accessing," or variations thereof, comprises "receiving," "referencing," or "retrieving." Further, the word "communicating," or variations thereof, has the same broad meaning as the word "receiving," or "transmitting" facilitated by software or hardware-based buses, receivers, or transmitters using communication media. Also, the word "initiating" or "invoking," or variations thereof, has the same broad meaning as the word "executing" or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

For purposes of a detailed discussion above, embodiments of the present disclosure described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present disclosure may generally refer to the distributed data object management system and the described schematics, it is understood that the techniques described may be extended to other implementation contexts.

From the foregoing, it will be seen that the present disclosure may be well adapted to attain all the ends and objects described above, including other advantages that are obvious or inherent to the structure. It will be understood that certain features and sub combinations are of utility and may be employed without reference to other features and sub combinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. One or more non-transitory computer storage media storing computer-readable instructions that, when executed by one or more processors, cause the one or more processors to perform operations, the operations comprising:

integrating a plurality of operations into a user application using a volatility-based decomposition architecture, the volatility-based decomposition architecture being configured to modify one or more portions of an integration service to accommodate changes in external databases, data formats, and data retrieval methods, wherein the integration service dynamically processes data received from an external server, a decision server, and a message server, wherein the external server is associated with an external database, the plurality of operations comprising:

providing access, via a user interface, to one or more users over a computer network, wherein the access allows input of information related to an applicant via one or more selectable fields;

based on providing of the access, receiving, by a centralized integration processor comprising the volatility-based decomposition architecture, a request to authorize the applicant via the input;

in response to the receiving of the request, querying, by the centralized integration processor and over the computer network, a plurality of external databases, each of the plurality of external databases comprising respective data associated with the applicant, each of the respective data being in a respective format, wherein the centralized integration processor operates based on a modified integration service, the modified integration service accommodating a change in the external database, a data format, or a data retrieval method;

converting, by the centralized integration processor, each of the respective data associated with the applicant into a single standardized format, the converting comprising data parsers that extract relevant information from each of the respective data and transforming data types into the single standardized format;

consolidating the converted data into a data store, by the centralized integration processor using the volatility-based decomposition architecture, the converted data in the single standardized format;

accessing a machine-learning model within the centralized integration processor;

utilizing the machine-learning model within the centralized integration processor and based at least in part on the input of the information to the one or more selectable fields, identify a first entity match within the converted data;

determining, by the machine-learning model within the centralized integration processor, a first confidence level of the first entity match;

based on the first confidence level being above a predetermined threshold, automatically generating, by the centralized integration processor, a message for a user to indicate if the first entity match is associated with the applicant;

using the message server, transmitting, over the computer network, the message to a user device associated with the user;

in response to the transmitting, receiving confirmation that the first entity match is associated with the applicant;

based on the confirmation, the first entity match, and the converted data, retraining the machine-learning to incorporate the data associated with the confirmation; and using the decision server, evaluating the converted data to generate a decision result with the applicant, the decision result indicating whether to approve or deny the application.

2. The one or more computer storage media of claim 1, wherein the request includes at least a set of information related to the applicant.

3. The one or more computer storage media of claim 2, wherein the information is input by a primary owner of an applicant entity.

4. The one or more computer storage media of claim 2, wherein the first entity match is at least a partial match with the applicant based on a similarity between the received information related to the applicant and a set of data related to the first entity.

5. The one or more computer storage media of claim 1, wherein the external database is associated with a credit insurer.

6. The one or more computer storage media of claim 1, wherein the first confidence level is at least partially based on a similarity between the received information related to the applicant and a set of data related to the first entity.

7. A method performed by one or more processors, the method comprising:

integrating a plurality of operations into a user application using a volatility-based decomposition architecture, the volatility-based decomposition architecture being configured to modify one or more portions of an integration service to accommodate changes in external databases, data formats, and data retrieval methods, wherein the integration service dynamically processes data received from an external server, a decision server, and a message server, wherein the external server is associated with an external database, the plurality of operations comprising:

providing access, via a user interface, to one or more users over a computer network, wherein the access allows input of information related to an applicant via one or more selectable fields;

based on providing the access, receiving, by a centralized integration processor comprising the volatility-based decomposition architecture, a request to authorize the applicant via the input;

in response to the receiving of the request, querying, by the centralized integration processor and over the computer network, a plurality of external databases, each of the plurality of external databases comprising respective data associated with the applicant, each of the respective data being in a respective format, wherein the centralized integration processor operates based on a modified integration service, the modified integration service accommodating a change in the external database, a data format, or a data retrieval method;

converting, by the centralized integration processor, each of the respective data associated with the applicant into a single standardized format, the converting comprising data parsers that extract relevant information from each of the respective data and transforming data types into the single standardized format;

consolidating the converted data into a data store, by the centralized integration processor using the volatility-based decomposition architecture, the converted data in the single standardized format;

accessing a machine-learning model within the centralized integration processor;

utilizing the machine-learning model within the centralized integration processor and based at least in part on the input of the information to the one or more selectable fields, identify a first entity match within the converted data;

determining, by the machine-learning model within the centralized integration processor, a first confidence level of the first entity match;

based on the first confidence level being above a pre-determined threshold, automatically generating, by the centralized integration processor, a message for a user to indicate if the first entity match is associated with the applicant;

using the message server, transmitting, over the computer network, the message to a user device associated with the user;

in response to the transmitting, receiving confirmation that the first entity match is associated with the applicant;

based on the confirmation, the first entity match, and the converted data, retraining the machine-learning to incorporate the data associated with the confirmation; and using the decision server, evaluating the converted data to generate a decision result with the applicant, the decision result indicating whether to approve or deny the application.

8. The method of claim 7, wherein the request includes at least a set of information related to the applicant.

9. The method of claim 8, wherein the information is input by a primary owner of an applicant entity.

10. The method of claim 8, wherein the first entity match is at least a partial match with the applicant based on a similarity between the received information related to the applicant and a set of data related to the first entity.

11. The method of claim 7, wherein the external database is associated with a credit insurer.

12. The method of claim 7, wherein the first confidence level is at least partially based on a similarity between the received information related to the applicant and a set of data related to the first entity.

13. A system comprising:
at least one processor; and
one or more computer storage media storing computer-readable instructions thereon that, when executed by the at least one processor, cause the at least one processor to execute operations comprising:
integrating a plurality of operations into a user application using a volatility-based decomposition architecture, the volatility-based decomposition architecture being configured to modify one or more portions of an integration service to accommodate changes in external databases, data formats, and data retrieval methods,
wherein the integration service dynamically processes data received from an external server, a decision server, and a message server, wherein the external server is associated with an external database, the plurality of operations comprising:
providing access, via a user interface, to one or more users over a computer network, wherein the access allows input of information related to an applicant via one or more selectable fields;
based on providing the access, receiving, by a centralized integration processor comprising the volatility-based decomposition architecture, a request to authorize the applicant via the input;
in response to the receiving of the request, querying, by the centralized integration processor and over the computer network, a plurality of external databases, each of the plurality of external databases comprising respective data associated with the applicant, each of the respective data being in a respective format, wherein the centralized integration processor operates based on a modified integration service, the modified integration service accommodating a change in the external database, a data format, or a data retrieval method;
converting, by the centralized integration processor, each of the respective data associated with the applicant into a single standardized format, the converting comprising data parsers that extract relevant information from each of the respective data and transforming data types into the single standardized format;
consolidating the converted data into a data store, by the centralized integration processor using the volatility-based decomposition architecture, the converted data in the single standardized format;
accessing a machine-learning model within the centralized integration processor;
utilizing the machine-learning model within the centralized integration processor and based at least in part on the input of the information to the one or more selectable fields, identify a first entity match within the converted data;
determining, by the machine-learning model within the centralized integration processor, a first confidence level of the first entity match;
based on the first confidence level being above a pre-determined threshold, automatically generating, by the centralized integration processor, a message for a user to indicate if the first entity match is associated with the applicant;
using the message server, transmitting, over the computer network, the message to a user device associated with the user;
in response to the transmitting, receiving confirmation that the first entity match is associated with the applicant;
based on the confirmation, the first entity match, and the converted data, retraining the machine-learning to incorporate the data associated with the confirmation; and
using the decision server, evaluating the converted data to generate a decision result with the applicant, the decision result indicating whether to approve or deny the application.

14. The system of claim 13, wherein the request includes at least a set of information related to the applicant.

15. The system of claim 14, wherein the information is input by a primary owner of an applicant entity.

16. The system of claim 14, wherein the first entity match is at least a partial match with the applicant based on a similarity between the received information related to the applicant and a set of data related to the first entity.

17. The system of claim 13, wherein the external database is associated with a credit insurer.

18. The system of claim 13, wherein the first confidence level is at least partially based on a similarity between the received information related to the applicant and a set of data related to the first entity.

* * * * *

UNITED STATES PATENT AND TRADEMARK OFFICE
CERTIFICATE OF CORRECTION

PATENT NO. : 12,406,298 B2  
APPLICATION NO. : 18/049193  
DATED : September 2, 2025  
INVENTOR(S) : Derek Overby and Irfan Sayyad Page 1 of 1

It is certified that error appears in the above-identified patent and that said Letters Patent is hereby corrected as shown below:

In the Claims

Column no. 23, Claim 1, Line no. 17 replace "providing of the" with --providing the--.

Signed and Sealed this
Sixteenth Day of December, 2025

John A. Squires
*Director of the United States Patent and Trademark Office*